United States Patent

Werkmann et al.

[11] Patent Number: 5,560,343
[45] Date of Patent: Oct. 1, 1996

[54] PRESSURE-LIMITING VALVE

[75] Inventors: Karl-Heinz Werkmann, Maintal; Frank Reiter, Bad Soden; Ivan Grgec-Messner, Kalkheim; Reiner Liebl, Eschborn, all of Germany

[73] Assignee: VDO Adolf Schindling AG, Frankfurt, Germany

[21] Appl. No.: 327,466

[22] Filed: Oct. 21, 1994

[30] Foreign Application Priority Data

Oct. 22, 1993 [DE] Germany .................. 43 36 061.0

[51] Int. Cl.⁶ .................................................. F02M 37/04
[52] U.S. Cl. .................. 123/514; 123/506; 137/469; 137/540
[58] Field of Search ..................... 123/514, 506, 123/467; 137/469, 536, 540

[56] References Cited

U.S. PATENT DOCUMENTS

| | | | |
|---|---|---|---|
| 2,918,083 | 12/1959 | Clark | 137/536 |
| 3,036,594 | 5/1962 | Salisbury | 137/536 |
| 3,626,975 | 12/1971 | Bobst | 137/469 |
| 3,945,396 | 3/1976 | Hengesbach | 137/540 |
| 4,350,179 | 9/1982 | Bunn | 137/536 |
| 4,766,930 | 8/1988 | Patti | 137/540 |
| 4,834,132 | 5/1989 | Sasaki | 123/514 |
| 5,133,324 | 7/1992 | Michiaki | 123/514 |
| 5,170,818 | 12/1992 | Hatzjkazakis | 137/469 |
| 5,251,664 | 10/1993 | Arvidsson | 127/469 |
| 5,361,742 | 11/1994 | Briggs | 123/514 |

*Primary Examiner*—Carl S. Miller
*Attorney, Agent, or Firm*—Martin A. Farber

[57] ABSTRACT

A pressure-limiting valve has a closure member (5) which, in its closed position, rests with initial stress against a valve seat (4) and has, on the side towards the valve seat (4), a shoulder (6) which can be formed by a circumferential flange (7) on the closure member (5). This induces enlargement of the opening stroke upon a slight opening of the closure member (5) as the flow strikes against the shoulder (6).

8 Claims, 1 Drawing Sheet

PRESSURE-LIMITING VALVE

FIELD AND BACKGROUND OF THE INVENTION

The present invention relates to a pressure-limiting valve for limiting the pressure in a return-flow line which extends from an injection system to a sucking-jet pump of a fuel delivery device of a fuel tank, which valve has a closure member which is urged by a closing spring into closed position against a valve seat, said closure member in its open position releasing a pressurized fluid connection from the return-flow line to the fuel tank, bypassing the sucking-jet pump.

Pressure-limiting valves of the above type are used in return-flow lines which extend in a motor vehicle from the injection system back to the fuel tank. In this connection the amount of fuel which flows back is conducted through a sucking-jet pump, in order by means of the latter, to draw, for instance, fuel from the fuel tank into a surge pot from which a fuel pump conveys fuel to the injection system.

Since the amount of fuel which flows back varies as a function of the instantaneous fuel consumption of the motor vehicle, corresponding pressure variations would occur in the return-flow line if a pressure-limiting valve were not used. Such variations in pressure would, however, affect the manner of operation of the sucking-jet pump. It is therefore necessary to limit these variations in pressure. In order to avoid reactions on the pressure regulator of the injection system, the pressure of the return flow must not be greater than about 1.4 bar and must exhibit only slight variations in pressure. In modern motor vehicles, pressure variations of between 1 bar and 1.4 bar can still be tolerated.

It has been found in practice that with ordinary pressure-limiting valves brief variations in pressure of more than 1.4 bar cannot be avoided. This is due to the fact that, after the initial opening of the closure member of the valve, there is a repeated brief closing of the closure member, thus producing pressure surges. The reason for this is that when the closure member is open, eddies form behind the valve seat in the pressure-limiting valve as a result of burbling phenomena, leading to an oscillating of the closure member and thus to pressure pulses.

SUMMARY OF THE INVENTION

The object of the present invention is so to develop a pressure-limiting valve of the aforementioned type that pressure pulses due to oscillation of the closure member of the pressure-limiting valve are avoided in as simple a manner as possible. This object is achieved in accordance with the invention in the manner that the closure member is provided, behind the valve seat as seen in the direction of flow, with a shoulder which, in the open position of the closure member, deflects the flow to the outside. This shoulder serves no purpose when the pressure-limiting valve is closed. However, as soon as the closure member is opened slightly so that there is flow in the pressure-limiting valve, this flow strikes against the shoulder and thereby produces an opening stroke which is substantially greater than in the case of a closure member without shoulder. This has the result that slight oscillations of the closure member due to eddies in the flow do not lead to an alternate opening and closing of the pressure-limiting valve and thus do not result in pressure pulses in the fuel within the return-flow line.

The pressure-limiting valve is of particularly simple development if the shoulder is formed by a circumferential flange on the closure member.

As an alternative, the shoulder, however, can also be developed in the manner that the diameter of the closure member is greater behind the shoulder, as seen in the direction of flow, then on the side facing the valve seat.

Eddies within the pressure-limiting valve which cause oscillations of its closure member can be avoided or at least limited if, in accordance with another further development of the invention, the closure member is continued on the side facing away from the valve seat behind the shoulder by a cylindrical flow member.

The closure member could be urged by a tension spring into closed position. The pressure-limiting valve is, however, of particularly simple construction if the cylindrical flow member is developed as a pot which is open on the side facing away from the valve seat and if the closure spring is introduced into this pot.

In order to avoid eddies which cause oscillations of the closure member within the pressure-limiting valve, it is advantageous for the valve seat to be of conical development and have a cone angle of 120° to 160°.

The flow conditions are optimal if the valve seat has a cone angle of 140°.

Oscillating movements of the closure member in radial direction, which can also lead to an undesired opening and closing of the pressure-limiting valve, can be avoided in simple fashion in the manner that, in accordance with another development of the invention, the closure member is guided radially by radial ribs on the housing.

It has surprisingly been found that a twisting of the closure member around its longitudinal axis can be the cause of an undesired oscillating movement. Therefore, it is advantageous for the closure member to be secured against twisting, which can be effected at little expense in the manner that the ribs extend up to directly in front of the flow member and the flange forming the shoulder has recesses which extend over the ribs.

BRIEF DESCRIPTION OF THE DRAWING

The invention permits of numerous possible embodiments. In order further to clarify its basic principle, one of such possible embodiments is shown in the drawing and will be described below. In the drawing.

DETAILED DESCRIPTION OF THE PREFERRED EMBODIMENT

Figure 1:
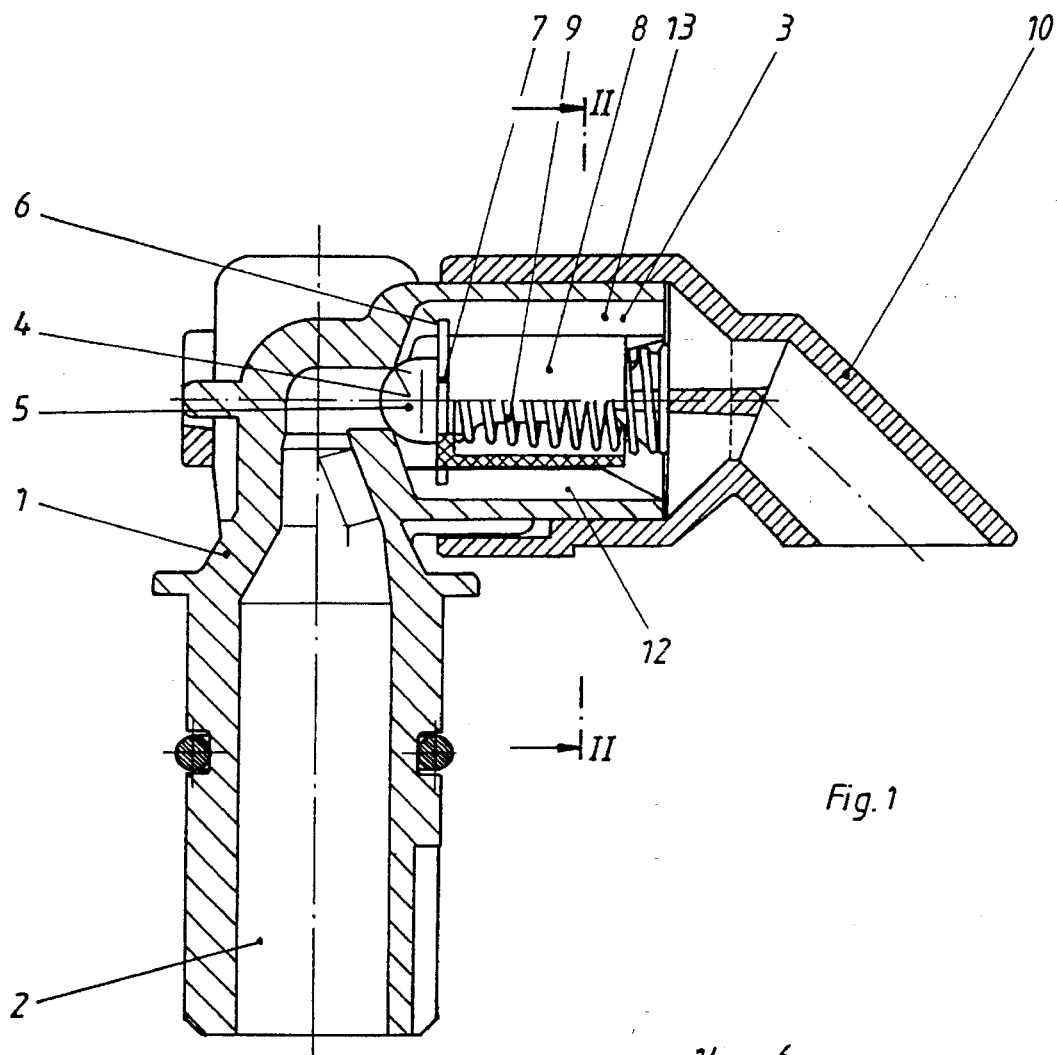
FIG. 1 is a longitudinal section through a pressure-limiting valve of the invention.

The pressure-limiting valve shown in FIG. 1 has a housing 1 with a pressurized-fluid inlet 2 and a pressurized-fluid outlet 3. There is furthermore provided in the pressure-limiting valve a conical valve seat 4 which has a cone angle of 140° and against which a closure member 5 rests in closed position.

It is important for the invention that the closure member 5 have a shoulder 6 which faces the valve seat 4 and which, in this embodiment, is formed by a surrounding flange 7.

Behind the flange 7 in the direction of flow, the closure member 5 continues in the form of cylindrical flow member 8 which is of greater diameter than the closure member 5 on the side of the flange 7 facing the valve seat 4 and which, in this embodiment, is developed as a pot which is open towards the side facing away from the valve seat 4. A closure spring 9 extends into this pot-shaped flow member 8, the spring urging the closure member 5 into closed position.

Figure 2:
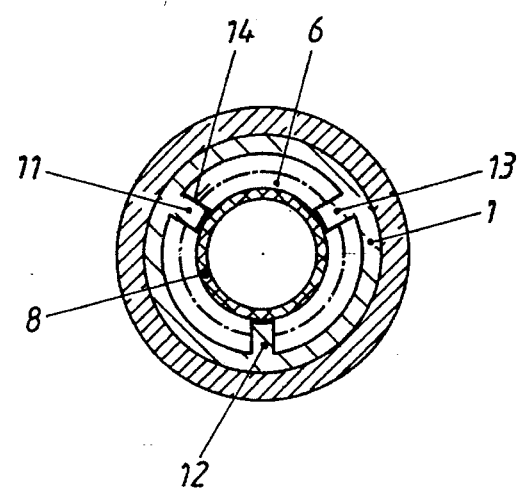
FIG. 2 is a cross section through the pressure-limiting valve along the line II—II of FIG. 1.

For the radial guiding of the closure member 5, the housing 1 has three radially directed ribs 11, 12, 13, which can be seen in full in FIG. 2, only the ribs 12 and 13 being visible in FIG. 1. These ribs 11, 12 and 13 extend up to against the flow member 8. The flange 7 forming the shoulder 6 therefore has corresponding recesses, such as, for instance, the recess 14 shown in FIG. 2. These recesses at the same time form an anti-twist device for the closure member 5.

The pressurized-fluid inlet 2 of the pressure-limiting valve shown is connected with a return-flow line (not shown) of an injection system of a motor vehicle, which line leads to a sucking-jet pump. Furthermore, a line 10 (shown in part) leads to a fuel tank or to a surge pot in a fuel tank. Should there be an increase in the pressure in the return-flow line due to a large amount of return flow, then the closure member 5 first of all opens in customary manner against the force of the closure spring 9. In this way, fuel from the pressurized-fluid inlet 2 can flow over the pressurized-fluid outlet 3 and the line 10 into the fuel tank, bypassing the sucking-jet pump, so that the pressure is decreased in the return-flow line. As soon as fuel flows through the valve seat 4, this flow strikes against the shoulder 6, which deflects the flow outward and, by the energy of flow of the fuel, effects an opening stroke of the closure member 5 which is greater than an ordinary opening stroke. In this way, swinging movements of the closure member 5 in axial direction caused by the flow do not lead to a rapidly alternating opening and closing of the pressure-limiting valve.

We claim:

1. A pressure limiting valve for limiting the pressure in a return-flow line which extends from an injection system to a sucking-jet pump of a fuel delivery device of a fuel tank, the valve comprising:

a closure member, a closure spring, and a valve seat; wherein said closure member is urged by said closure spring against said valve seat in a closed position of the valve;

said closure member, in an open position of the valve, releases a pressurized-fluid connection from the return-flow line to the fuel tank with a bypassing of the sucking-jet pump;

said closure member has, behind the valve seat as seen in the direction of flow, a substantially radially outwardly extending shoulder which deflects the flow outward with respect to said shoulder in the open position of the valve; and said valve seat forms a conical surface defining a conical axis and having a cone angle of 120° to 160°, said cone angle being formed by intersecting with said conical surface of a cross-sectional plane through the valve seat, said plane containing the conical axis and intersecting an imaginary vertex of the conical surface forming the apex of the cone angle.

2. A pressure-limiting valve according to claim 1, wherein said shoulder comprises a flange surrounding said closure member.

3. A pressure-limiting valve according to claim 2, wherein a diameter of said closure member is greater behind said shoulder, as seen in the direction of flow, than on the side of said shoulder facing the valve seat.

4. A pressure-limiting valve according to claim 1, further comprising a cylindrical flow member; and wherein said closure member is continued on a side facing away from said valve seat behind said shoulder by said cylindrical flow member.

5. A pressure-limiting valve according to claim 4, wherein said cylindrical flow member has the shape of a pot having a cavity which is open in a direction facing away from said valve seat, and said closure spring extends into said cavity.

6. A pressure-limiting valve according to claim 1, wherein said cone angle is 140°.

7. A pressure-limiting valve according to claim 1, further comprising ribs extending along a housing of an outlet chamber of the valve, wherein said closure member is radially guided by said ribs.

8. A pressure-limiting valve according to claim 7, wherein said shoulder comprises a flange surrounding said closure member;

the valve includes a cylindrical flow member extending in a downstream direction of said closure member; and said ribs extend to directly in front of said flow member and said flange, said shoulder having recesses which extend over said ribs.

* * * * *